(12) United States Patent
Tsutsui

(10) Patent No.: US 6,274,994 B2
(45) Date of Patent: Aug. 14, 2001

(54) SERVO CONTROL APPARATUS

(75) Inventor: Kazuhiko Tsutsui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/758,201

(22) Filed: Jan. 12, 2001

Related U.S. Application Data

(63) Continuation of application No. PCT/JP99/02521, filed on May 14, 1999.

(51) Int. Cl.⁷ .................................................. G05B 11/01
(52) U.S. Cl. .................... 318/560; 318/568.22; 318/629; 318/632
(58) Field of Search .................. 318/560, 568.22, 318/629, 630, 632

(56) References Cited

U.S. PATENT DOCUMENTS

| | | | |
|---|---|---|---|
| 4,887,015 | * 12/1989 | Kurakake et al. | 318/609 |
| 4,916,375 | * 4/1990 | Kurakake et al. | 318/630 |
| 5,105,135 | * 4/1992 | Nashiki et al. | 318/568.11 |
| 5,107,193 | * 4/1992 | Iwashita | 318/560 |
| 5,134,354 | * 7/1992 | Yamamoto et al. | 318/609 |
| 5,204,602 | * 4/1993 | Iwashita | 318/630 |
| 5,260,629 | * 11/1993 | Ioi et al. | 318/568.19 |
| 5,589,748 | * 12/1996 | Kazama et al. | 318/560 |
| 5,691,616 | * 11/1997 | Iwashit | 318/615 |
| 5,825,150 | * 10/1998 | Kachi et al. | 318/610 |
| 6,008,612 | * 12/1999 | Tanaka et al. | 318/652 |
| 6,107,771 | * 8/2000 | Maeda | 318/630 |

FOREIGN PATENT DOCUMENTS

| | | | |
|---|---|---|---|
| 62-48284 | 3/1987 | (JP) . | |
| 1-186186 | 7/1989 | (JP) . | |
| 101997 | * 4/1990 | (JP) | 318/632 |
| 3-169283 | 7/1991 | (JP) . | |
| 5-285786 | 11/1993 | (JP) . | |
| 245582 | * 9/1994 | (JP) | 318/560 |
| 320076 | * 12/1997 | (JP) . | |

* cited by examiner

*Primary Examiner*—Robert E. Nappi
*Assistant Examiner*—Rina I. Duda
(74) *Attorney, Agent, or Firm*—Sughrue, Mion, Zinn, Macpeak & Seas, PLLC

(57) ABSTRACT

In a servo control apparatus in which a machine system is driven by a servo motor, a phase compensation device is provided. The phase compensating device calculates a speed component (phase delay compensation signal) corresponding to a phase delay caused by a mechanical resonance suppressing filter which is provided so as to suppress resonance and mechanical vibrations, produced by a characteristic frequency owned by the machine system. While such a signal obtained by adding this speed component (phase delay compensation signal) to an actual motor speed is used as a speed feedback signal for a control operation, unstable conditions of a servo system, which are caused by the phase delay caused when the mechanical resonance filter is applied, are suppressed, and a high gain of the servo control apparatus is realized.

7 Claims, 12 Drawing Sheets

SERVO CONTROL APPARATUS

CROSS REFERENCE TO RELATED APPLICATION

This is a continuation of International Application PCT/JP99/02521, with an international filing date of May 14, 1999, the contents of which is hereby incorporated by reference into the present application.

BACKGROUND OF THE INVENTION

The present invention relates to a servo control apparatus, and more specifically, to a servo control apparatus for controlling a servo motor used to drive a machine tool and the like.

FIG. 14 is a block diagram for showing a conventional servo control apparatus. In this drawing, reference numeral 1 indicates a position command producing unit, reference numeral 2 represents a position control unit, reference numeral 3 indicates a speed control unit, and reference numeral 4 is a mechanical resonance suppressing filter, which is constructed of, for instance, a notch filter and the like, and is provided so as to remove resonance and vibrations caused by a characteristic frequency of a machine system and the like, and reference numeral 5 shows a current control unit, reference numeral 6 indicates a current drive means constituted by, for example, a power amplifying circuit and the like. Also, reference numeral 7 denotes a servo motor for driving the machine system, reference numeral 8 represents an encoder for detecting a rotary position of the servo motor 7, and reference numeral 9 shows a differentiating means for differentiating a position detection signal outputted from the encoder 8. It should be noted that a detection means for detecting the motor speed is composed of the encoder 8 and the differentiating means 9.

Reference numeral 10 shows a position command signal outputted from the position command producing unit 1, reference numeral 11 represents a position feedback signal indicative of a rotary position of the servo motor 7, which is outputted from the encoder 8, and reference numeral 12 is a speed command signal outputted from the position control unit 2, reference numeral 13 indicates a speed detection signal (speed feedback signal) outputted from the differentiating means 9, reference numeral 14 shows a speed deviation signal equal to a difference between the speed command signal 12 and the speed detection signal 13, reference numeral 15 represents a current command signal outputted from the speed control unit 3, reference numeral 16 denotes a filter output current command signal which is again produced via the mechanical resonance suppressing filter 4, and reference numeral 17 indicates a current feedback signal indicative of a current flowing through the servo motor 7.

This servo control apparatus is so arranged as to control the servo motor 7 in such a manner that the position feedback signal 11 indicative of the rotary position of the servo motor 7 which is detected by the encoder 8 may follow the position command signal 10 outputted from the position command producing unit 1. Also, in order to perform this operation in a high speed and under stable condition, the position control unit 2 produces the speed command signal 12 based upon the deviation signal between the position command signal 10 and the position feedback signal 11. Furthermore, the speed control unit 3 outputs the current command signal 15 to the servo motor 7 in such a manner that the speed feedback signal 13 which is produced by the differentiating means 9 based upon the position feedback signal 11 may follow the speed command signal 12.

As previously explained, reference numeral 16 shows a filter output current command signal which is outputted from the mechanical resonance suppressing filter 4. Both the current control unit 5 and the power amplifier 6 controls the current which is supplied to the servo motor 7 in order that the current feedback signal 17 Which indicates a value of a current flowing through the servo motor 7 may follow the current command signal 16. Also, reference 18 indicates a machine system driven by the servo motor 7, and reaction force 19 produced by this machine system may give an effect to the power of the servo motor 7.

In this case, in order to increase the following characteristic with respect to the command of the servo motor 7, while either the resonance characteristic of the position loop which is defined from the position command signal 10 to the position feedback signal 11 or the response characteristic of the speed loop which is defined from the speed command signal 12 to the speed feedback signal 13 are increased, the mechanical resonance and the vibrations are produced due to the characteristic frequencies existing in the machine system 18 driven by the servo motor 7. As a result, not only the machine system 18 is operated under unstable condition, but also the control loop itself of the servo motor 7 is brought into the unstable condition.

In the above-described conventional servo control apparatus, while the mechanical resonance suppression filter 4 is inserted between the current command signals 15 and 16 so as to reduce the mechanical resonance and the vibrations, in the case where the characteristic frequency of the mechine system 18 is low and the frequencies of the mechanical resonance and of the vibrations are low, the resonance eliminating frequency of the mechanical resonance suppressing filter 4 must be set to the low frequency. As a result, when this setting frequency of the mechanical resonance suppressing filter 4 approaches the response range of the speed loop, the adverse influence caused by the phase delay in the servo control loop, in particular, defined from the speed command signal 12 to the speed feedback signal 13 is increased, so that the phase margin of the speed loop corresponding to the closed loop defined from the speed command signal 12 to the speed feedback signal 13 is lost and thus, the control system is brought into the unstable condition. This may cause a problem in that enhancement of the performance is hindered while the response characteristic of the servo control system is increased and also the following characteristic of the position feedback signal 11 to the position command signal 10, namely the major purpose of the servo system, is increased.

Also, as the mechanical resonance suppressing filter 4, there are many cases that notch filters capable of removing only certain fixed frequency components are used. However, since there are many cases in which a plurality of characteristic frequencies are present in the machine system 18, it is practically difficult to remove all of the mechanical resonance by employing such notch filters. To the contrary, one solution may be conceived. That is, while a low-pass filter is employed as the mechanical resonance suppressing filter 4, the gain higher than, or equal to a certain specific frequency is reduced. In this case, since the phase delay is commenced from the very low frequency range with respect to the setting frequency, there are such problems that the adverse influence is easily given also to the control range of the speed loop, and the phase margin of the speed loop with respect to the notch filter can be hardly obtained.

SUMMARY OF THE INVENTION

The present invention has been made to solve the above-described problems, and therefore, has an object to provide a servo control apparatus capable of reducing an adverse influence of a phase delay caused by inserting a mechanical resonance filter, and thus, capable of realizing a servo system having a high gain by performing the calculation of the phase delay of the mechanical resonance suppressing filter while a speed component corresponding to this phase delay is added to an actual motor speed and then, the resulting actual motor speed is employed as a speed feedback signal for a control.

A servo control apparatus of the present invention comprises: a servo motor for driving a predetermined machine system; detection means for detecting both a position of the servo motor and a speed of the servo motor; position control means for producing a speed command signal based upon a difference between an externally entered position command signal and a position detection signal outputted from the detection means; speed control means connected to the position control means, for producing a first current command signal indicative of a value of a current to be supplied to the servo motor; mechanical resonance suppressing filter means for converting the first current command signal into a second current command signal used to suppress resonance and vibrations, which are caused by a characteristic frequency of the machine system; current control means for controlling a current to be supplied to the servo motor based upon the second current command signal; phase compensating means for calculating based on the first current command signal, a speed component corresponding to a phase delay occurring in a speed loop defined from the speed command signal up to the speed detection signal, which is caused by providing the mechanical resonance suppressing filter means; and for outputting the speed component obtained by the calculation as a phase delay compensation signal; and speed feedback signal producing means for producing a speed feedback signal by adding the phase delay compensation signal to the speed detection signal, wherein the speed control means produces the first current command signal based upon a difference between the speed command signal outputted form the position control means and the speed feedback signal.

The mechanical resonance suppressing filter means may comprise an FIR type notch filter.

Alternatively, the mechanical resonance suppressing filter means may comprise a low-pass filter for removing frequency components higher than, or equal to a specific frequency.

Also, the low-pass filter includes an integrating device.

The servo control apparatus of the present invention further comprises: compensation signal reducing means provided between the phase compensating means and the speed feedback signal producing means, for reducing the phase delay compensation signal, in the case where a frequency of the first current command signal is lower than a predetermined value.

The speed control means may comprise a proportional control unit for performing a proportional control and an integral control unit for performing an integral control. The proportional control unit may produce a proportional term current command signal based upon the difference between the speed command signal outputted from the position control means and the speed feedback signal. The integral control unit may produce an integral term current command signal based upon the difference between the speed command signal outputted form the position control means and the speed detection signal outputted form the detection means. A signal obtained by adding the proportional term current command signal to the integral term current command signal may be used as the first current command signal corresponding to the output of the speed control means.

The proportional term current command signal outputted form the proportional control unit may be employed as an input of the phase compensating means.

DESCRIPTION OF THE PREFERRED EMBODIMENTS

Figure 1:
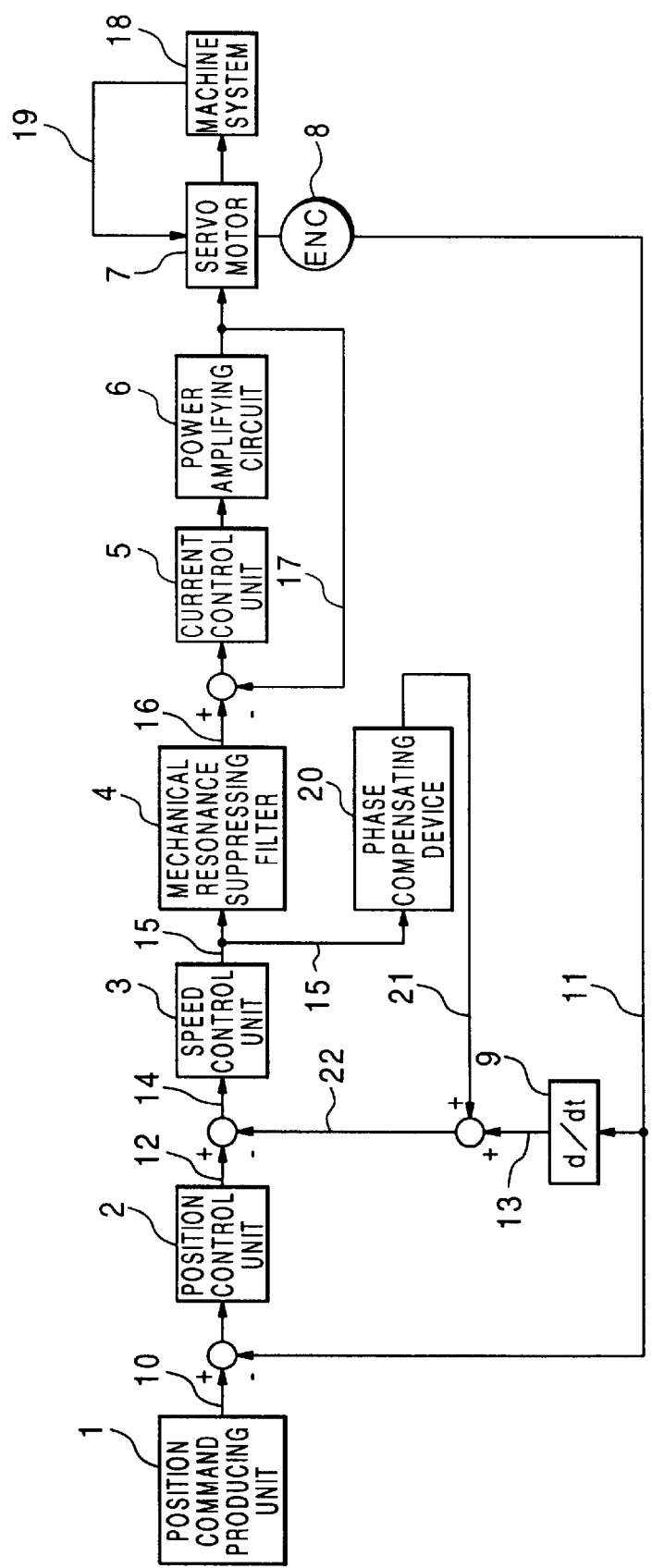
FIG. 1 is a block diagram for showing a servo control apparatus according to an embodiment 1 of the present invention.

Referring now to the drawings, a description will be made of preferred embodiments of the present invention.
Embodiment 1.

FIG. 1 is a block diagram of a servo control apparatus according to an embodiment 1 of the present invention. In this drawing, since reference numerals 1 to 19 are similar to those of the above-explained components shown in FIG. 14, explanations thereof are omitted. It should be noted that reference numeral 20 shows a phase compensating device which receives a current command signal 15 outputted from the speed control unit 3 and outputs a phase delay compensation signal 21. Also, the mechanical resonance suppressing filter 4 in this embodiment is constituted by an FIR type notch filter.

Figure 14:
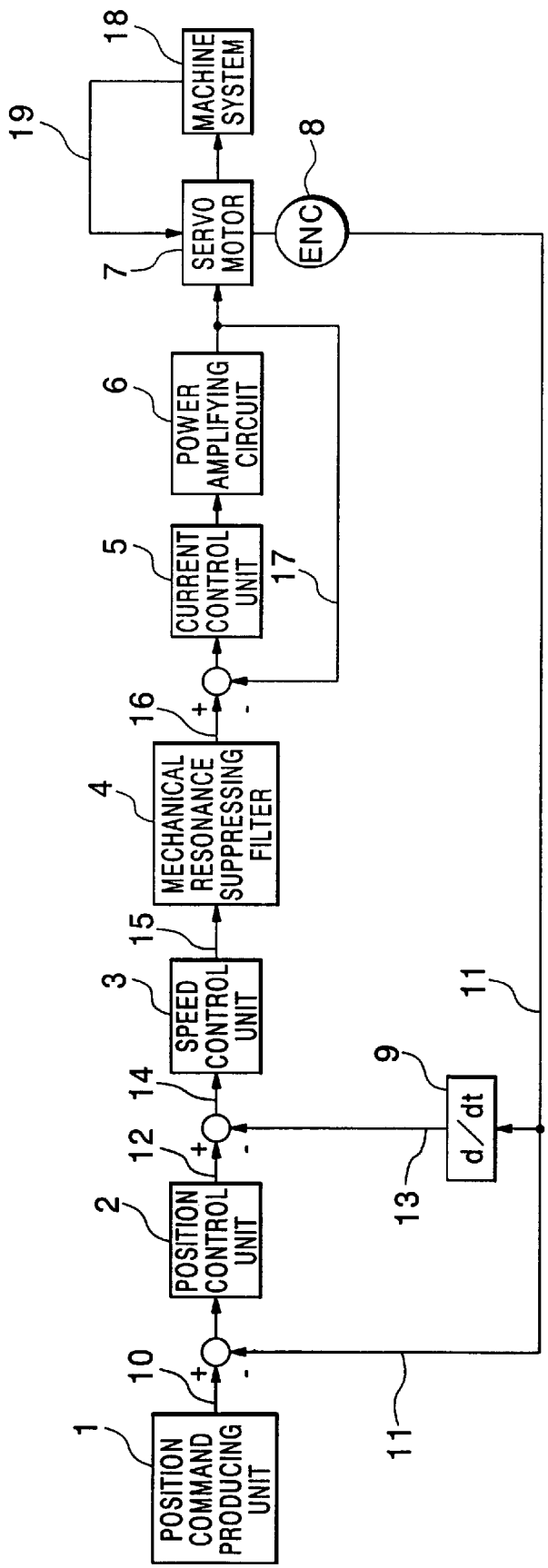
FIG. 14 is a block diagram for showing the conventional servo control apparatus.

Although operations of the servo control apparatus according to this embodiment 1 are basically the same as those of the conventional servo control apparatus shown in FIG. 14, a different point is as follows: That is, in this embodiment, the phase delay compensation signal 21 corresponding to the output of the phase compensating device 20 is added to the speed detection signal 13, so that a speed feedback signal 22 is formed. In this embodiment 1, while the phase compensating device 20 uses as an input, the same command signal as the current command signal 15 corresponding to the input signal into the mechanical resonance suppressing filter 4, this phase compensating device 20 calculates a phase delay produced in the speed loop defined from the speed command signal 12 to the speed detection signal 13, and this phase delay is caused by inserting the mechanical resonance suppressing filter 4.

Figure 2:
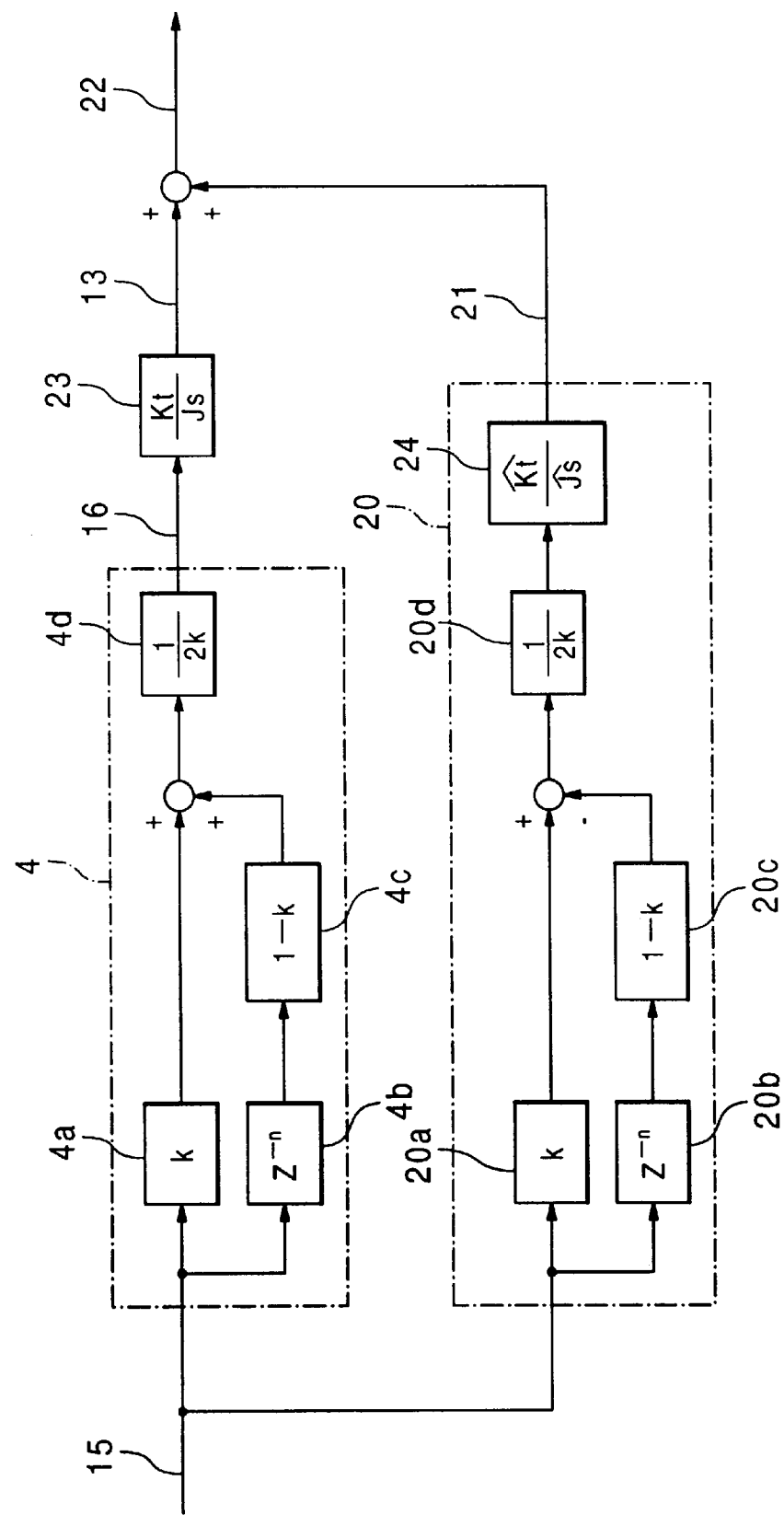
FIG. 2 is a partially block diagram showing a relationship between a mechanical resonance suppressing filter and a phase compensating device employed in the servo control apparatus of FIG. 1.

FIG. 2 represents a phase delay compensating method executed in the case that an FIR filter typically known in the field is used as the mechanical resonance suppressing filter 4. In this case, generally speaking, since the response characteristic of the current loop defined from the current command signal 16 to the current feedback signal 17 is sufficiently high with respect to the response characteristic of the speed loop corresponding to the loop located outside this current loop, the current command signal 16 as it is may be handled as a value of a current flowing through the servo motor 7. As shown in FIG. 2, in this embodiment, the mechanical resonance suppressing filter 4 is constituted by a term 4a of (k), a term 4b of ($Z^{-n}$), a term 4c of (1−k), and a term 4d of (1/2k). It is now assumed that the current command signal 15 is inputted to both the term 4a and the term 4b, a signal which is obtained by adding the output obtained via the term 4b and the term 4c to the output of the term 4a is entered into the term 4d, and the output from the term 4d is used as the output 16 of the mechanical resonance suppressing filter 4. Also, the phase compensating device 20 is constituted by a term 20a of (k), a term 20b of ($Z^{-n}$), a term 20c of (1−k), a term 20d of (1/2k), and a term 24 of (Kt hat/J hat s). It is now assumed that the current command signal 15 is fed to both the term 20a and the term 20b, a signal which is obtained by subtracting the output obtained via both the terms 20b and 20c from the output of the term 20a is inputted into the term 20d, and furthermore, the output from the term 20d is entered into the term 24, and then, the output from the term 24 is used as the output 21 of the phase compensating device 20. It should be understood that a term 23 of (Kt/Js) shown in FIG. 2 corresponds to a term which indicates the motor current up to the speed of the motor, and constitutes a transfer function defined from a motor current 17 (=current command signal 16) to the speed detection signal 13. Similarly, the term 24 of (Kt hat/J hat s) shown in FIG. 2 constitutes a transfer function defined from the motor current 17 to the speed detection signal 13 seen from the control system. In this case, symbol "Kt" indicates a torque constant of a motor, indicative of a ratio of the torque outputted from the servo motor 7 to the motor current, and symbol "J" represents motor shaft-converted load inertia involving the machine system 18 and the servo motor 7. At this time, the compensation for the phase delay is calculated by the phase compensating device 20 containing the arrangement (20a–20d and 24) shown in FIG. 2 provided inside the servo control apparatus. It should also be noted that both the torque constant Kt of the motor and the motor shaft-converted load inertia J are the design values, or the torque constant Kt is already known from the actual measurement values of the servo motor 7 and the actual measurement values when the machine is manufactured. It should further be noted that the coefficient "k" in the terms 4a and 20a of (k) and in the terms 4c and 20c of (1−k) corresponds to a predetermined proportional constant owned by the notch filter (digital filter). In a general-purpose notch filter, a value of k=0.5 is employed as this coefficient k. The signal components of such input signals, which are located near the central frequency of the filter, are removed at maximum when k=0.5. While the value of the coefficient k approaches 1 from 0.5, the signal components to be removed are reduced. The symbol "$Z^{-n}$" that appears in the terms 4b and 20b of ($Z^{-n}$) corresponds to a general-purpose symbol which is used for representing discrete time. In an actual digital control, it is known that a CPU executes a process operation at every certain fixed time period (sampling period). Also, symbol ($Z^{-n}$) shows a function at which sampling data before the sampling operation is carried out "n" times is outputted.

Figure 3:
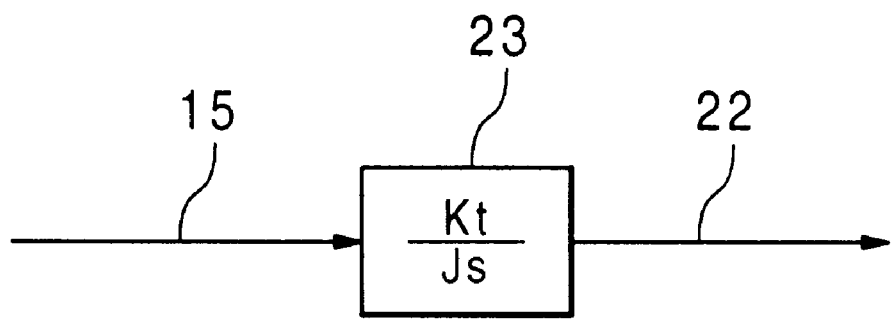
FIG. 3 is a block diagram for representing the effect of the embodiment 1 of the present invention.

FIG. 3 is a block diagram for showing a circuit defined from the current command signal 15 up to the speed feedback 22, which is a current command signal before being entered into the mechanical resonance suppressing filter 4 in the case that the term 24 of (Kt hat/J hat s) shown in FIG. 2 is made equal to the term 23 of the actual (Kt/Js). As apparent from FIG. 2, there are two differences between the structural element of the mechanical resonance suppressing filter 4 and the structural element of the phase compensating device 20. As one of these differences, the term 24 of (Kt hat/J hat s) is additionally provided within the phase compensating device 20. Other structural elements 4a to 4c and 20a to 20c correspond to each other. As explained above, another difference is such that the output signal of the term 4c of (1−k) is added to the output signal of the term 4a of (k) in the mechanical resonance suppressing filter 4, whereas the output signal of the term 20c of (1−k) is conversely subtracted from the output signal of the term 20a of (k) in the phase compensating device 20. As a result, in the case that the term 23 is equal to the term 24, the output of the term 4c of (1−k) is canceled with the output of the term 20c of (1−k), resulting in the circuit as shown in the block diagram of FIG. 3.

As previously explained, the phase delay caused by the mechanical resonance suppressing filter 4 is corrected by the phase compensating device 20 indicated in the block diagrams of FIG. 1 and FIG. 2, and the phase delay which is caused by inserting the mechanical resonance suppressing filter 4 is improved. Also, since the phase compensating device 20 is arranged by a form in which the frequency range whose gain is cut by the mechanical resonance suppressing filter 4 is compensated, the phase compensation signal 21 can be substantially neglected in the low frequency range where the phase compensation is not required, and the speed detection signal 13 corresponding to the actual machine speed is made substantially identical to the speed command signal 12.

Figure 9:
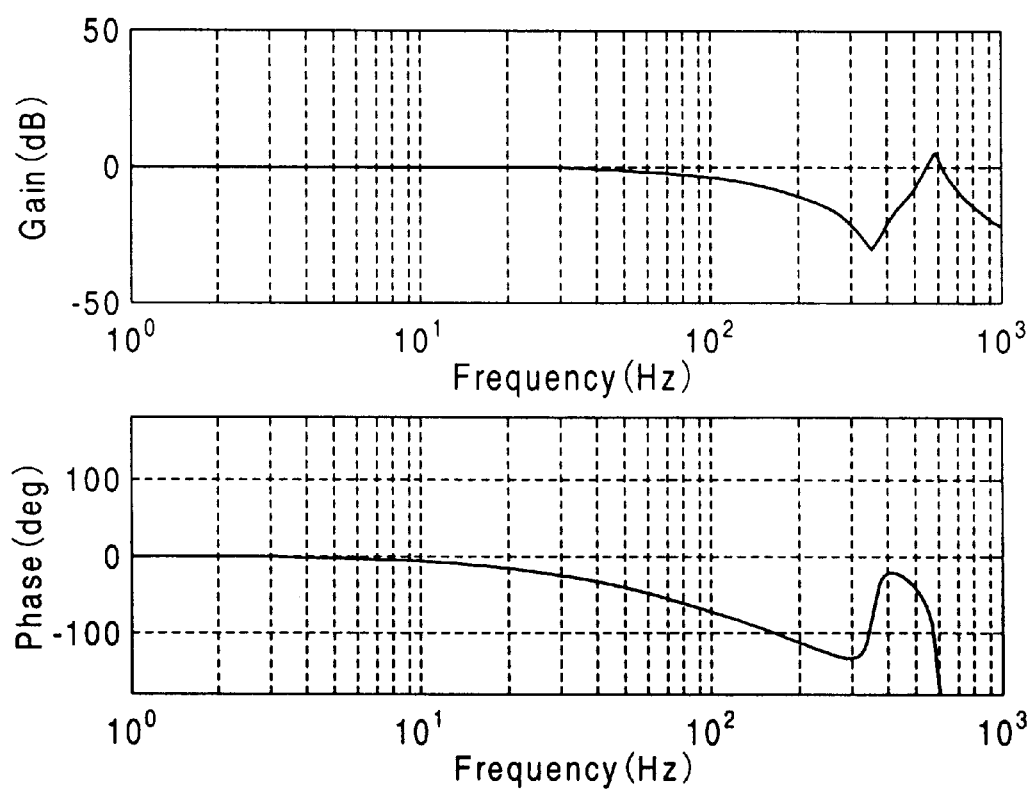
FIG. 9 is a graph for showing the frequency response of the speed loop of the conventional servo control apparatus having the mechanical resonance.
Figure 10:
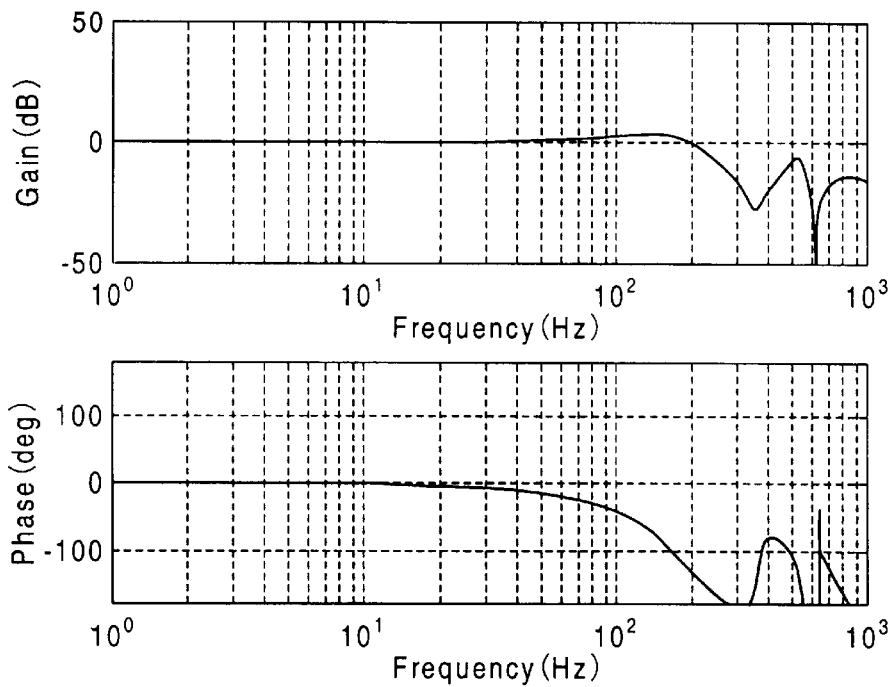
FIG. 10 is a graph for representing the frequency response of the speed loop in the case that a notch filter is applied to the conventional servo control apparatus having the mechanical resonance.
Figure 11:
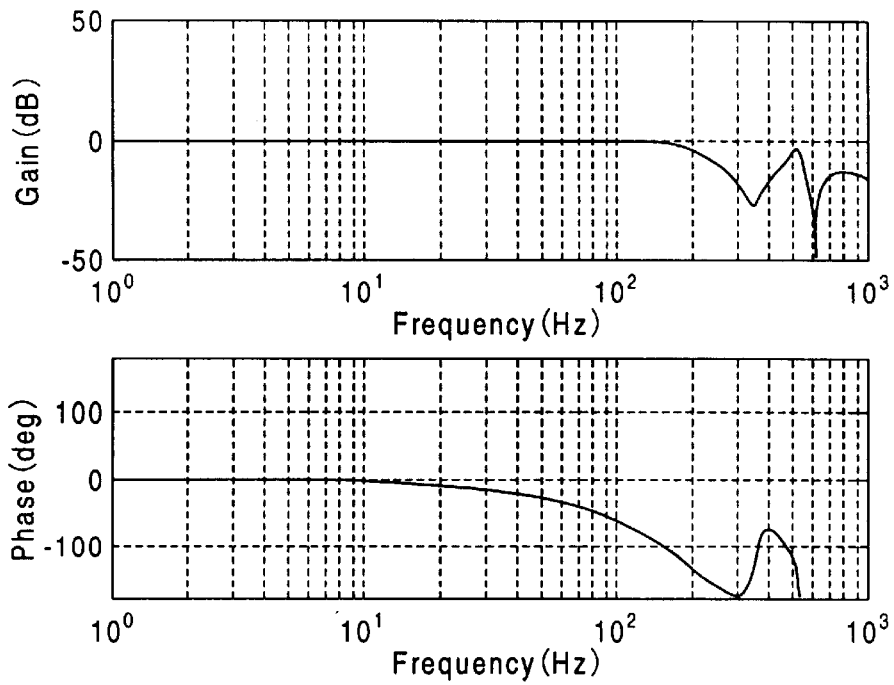
FIG. 11 is a graph for indicating a frequency response of a speed loop of a servo control apparatus having mechanical resonance indicative of an effect of the embodiment 1 of the present invention.

FIG. 9 shows a simulation result indicating a frequency response of a speed loop defined from a speed command up to a speed feedback of a conventional servo system having a mechanical resonance of approximately 600 Hz. In this case, a gain of this mechanical resonance of 600 Hz exceeds 0 dB, so that the mechanical resonance may give an adverse influence also to both the servo control system and the mechanical system. Thus, FIG. 10 shows such a case of the conventional servo system indicated in FIG. 14 that the notch filter is inserted into the circuit portion subsequent to the speed control unit 3 in this system. At this time, it may be understood that although the adverse influence caused by the mechanical resonance of a 600 Hz can be relaxed, the gain exceeds 0 dB and then is further increased in the speed control range due to the adverse influence of the phase delay of the notch filter, and also the phase margin is lost, resulting in an unstable system as a speed control loop. In this case, FIG. 11 represents a speed loop frequency response, defined from the speed command signal 12 up to the speed detection signal 13 of the servo control apparatus in the case that the phase compensating device 20 of FIG. 1 and FIG. 2, according to the embodiment 1 of the present invention is conducted. At this time, there is no gain increase in the speed control range as seen in FIG. 10, and the stable control loop capable of obtaining the phase margin can be realized.

As previously explained, in the servo control apparatus for controlling the positions of the feeding shafts of the machine tool and the drive apparatus with employment of the servo motor, the mechanical resonance suppressing filter 4 is normally inserted in order to achieve such a purpose that both the resonance and the mechanical vibrations caused by the characteristic frequencies owned by the mechanical system are suppressed and the gain of the servo system is increased. However, in the case that the mechanical resonance frequency is low and approaches the control range of the speed loop and also the control range of the position loop, if the mechanical resonance suppressing filter 4 is inserted, then there are some possibilities that the phase margin of the servo control system is lost and the servo control system is brought into the unstable condition because of the phase delay owned by this mechanical resonance suppressing filter 4. In such a case, after all, to avoid such an unstable servo control system, the control range of the servo loop is decreased. As a result, the servo system cannot own the high gain, and it is difficult to obtain such a servo system having a high response and high performance. In accordance with the present invention, while such a phase delay of the mechanical resonance suppressing filter is calculated, the speed feedback signal 22 which is obtained by adding the speed component equivalent to this phase delay to the actual motor speed is used in the servo control. As a consequence, the adverse influence by the phase delay caused by inserting the mechanical resonance filter can be reduced, so that the high gain of the servo system can be realized.

Embodiment 2.

Figure 4:
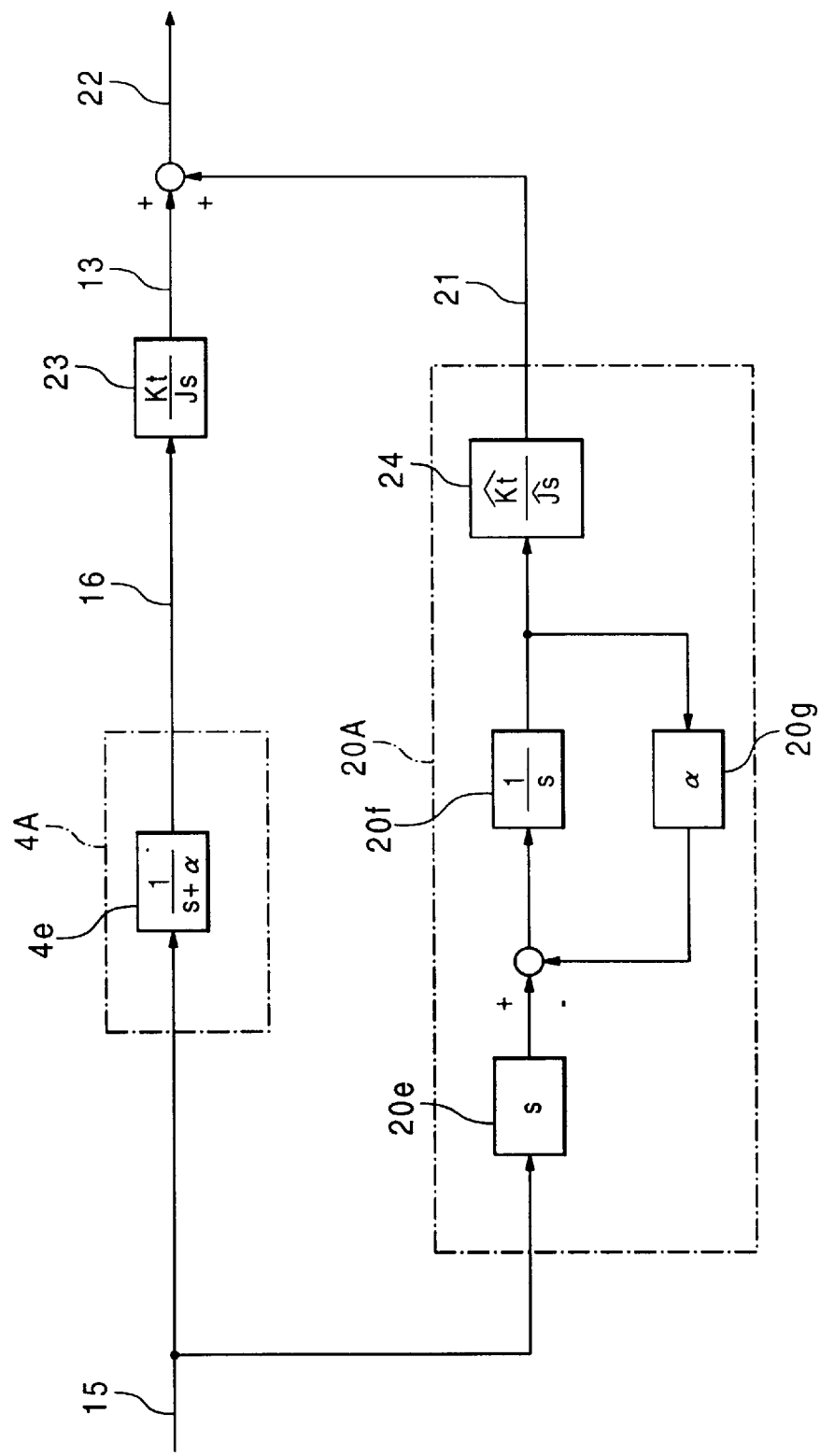
FIG. 4 is a partially block diagram for indicating a relationship between a mechanical resonance suppressing filter and a phase compensating device, according to an embodiment 2 of the of present invention.

FIG. 4 is a block diagram for partially indicating a servo control apparatus according to an embodiment 2 of the present invention. Since other arrangements not shown in FIG. 4 are similar to the above-described arrangements of FIG. 1, a description is made with reference to FIG. 1. In the embodiment 2, a phase delay compensating method is indicated in the case that a mechanical resonance suppressing filter 4A constructed of a low-pass filter is used instead of the mechanical resonance suppressing filter 4 shown in FIG. 1. As represented in FIG. 4, the mechanical resonance suppressing filter 4A is arranged by a primary delay system of a term 4e of (1/(s+α)). Also, as shown in FIG. 4, a phase compensating device 20A, according to this embodiment 2, is arranged by a term 20e of (s), a term 20f of (1/s), a term 20g of (α), and a term 24 of (Kt hat/J hat s). In this case, symbol "s" denotes the Laplace operator, symbol "s" indicates a differentiation, and symbol "1/s" represents an integration. Similar to FIG. 2, in this case, generally speaking, since the response characteristic of the current loop defined from the current command signal 16 to the current feedback signal 17 is sufficiently high with respect to the response characteristic of the speed loop corresponding to the loop located outside this current loop, the current command signal 16 may be directly handled as a value of a current flowing through the servo motor 7.

Similar to the embodiment 1, in this case, when the term 24 of (Kt hat/J hat s) shown in FIG. 4 is made equal to the term 23 of the actual (Kt/Js), a transfer function may be indicated by the block diagram of FIG. 3. This transfer function is defined from the current command signal 15 before being inputted to the mechanical resonance suppressing filter 4A up to the speed feedback 22. As a result, the phase delay caused by the mechanical resonance suppressing filter 4A is corrected by the phase compensating device indicated in the block diagrams of FIG. 1 and FIG. 4, and the phase delay which is caused by inserting the mechanical resonance suppressing filter is improved. Also, since the phase compensating device 20A is arranged by a form in which the frequency range whose gain is cut by the mechanical resonance suppressing filter 4A is compensated, the phase compensation signal 21 can be substantially neglected in the low frequency range where the phase compensation is not required, and the speed detection signal 13 corresponding to the actual machine speed is made substantially identical to the speed command signal 12.

As previously explained, as the mechanical resonance suppressing filter, a notch filter is used so as to have such a purpose that the filter effect thereof may be achieved only to frequency components which have been suppressed as many as possible. When a system owns a mechanical resonance having a large number of frequencies, there are cases in which these frequencies can not be suppressed by a notch filter. In such a case, a low-pass filter capable of removing frequency components higher than, or equal to a specific frequency may be effectively employed as a filter. In the case that resonance is mechanically suppressed by the low-pass filter, a cut-off frequency of this low-pass filter must be set to a very low frequency, which may give very large adverse influences to the servo control range. Thus, it is practically difficult to realize a servo system having a high gain. However, in accordance with this embodiment, even when the low-pass filter is employed in the mechanical resonance suppressing filter, since the phase delay is compensated, the control system having the high gain can be obtained under stable condition.

Embodiment 3.

Figure 5:
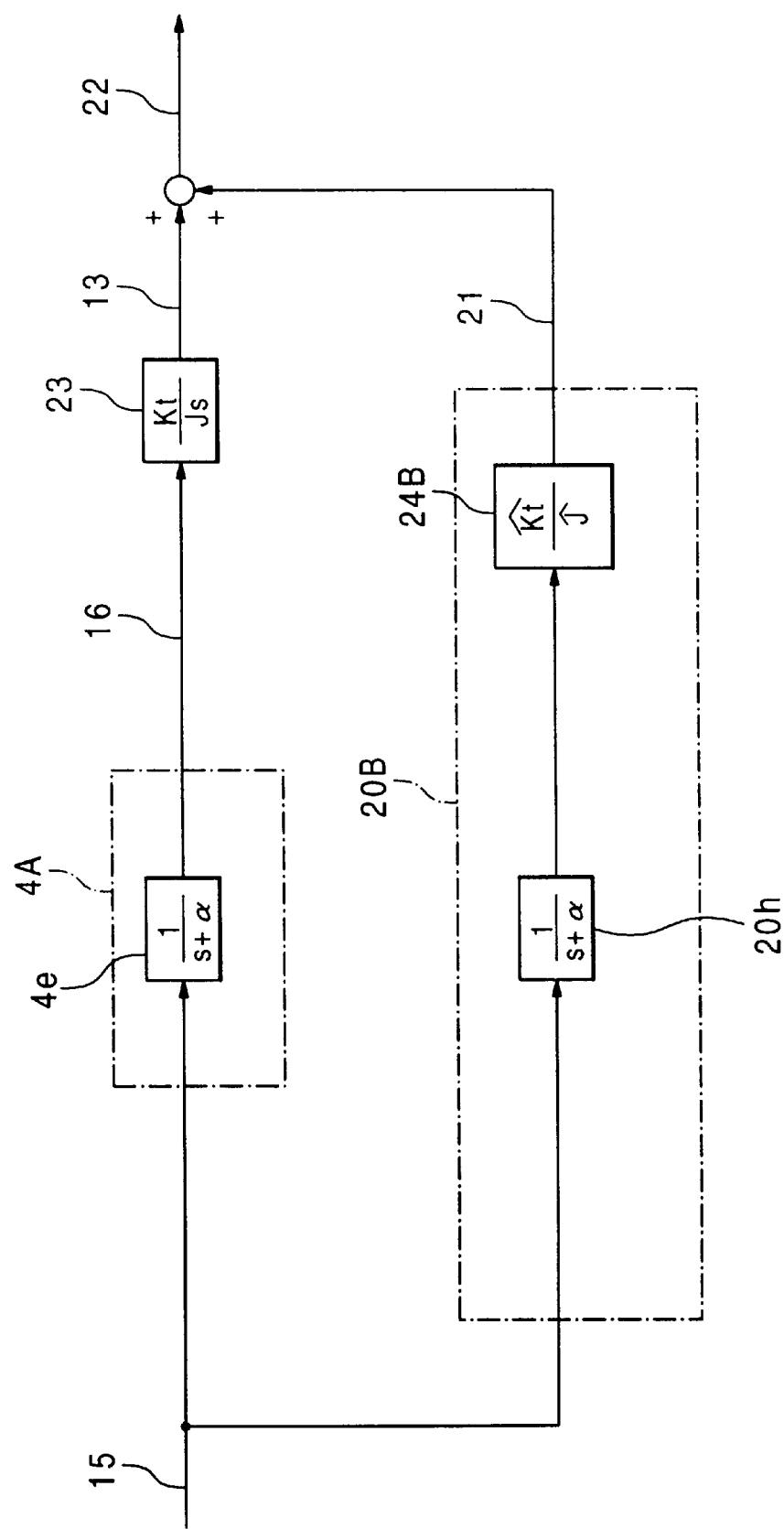
FIG. 5 is a partially block diagram for indicating a relationship between a mechanical resonance suppressing filter and a phase compensating device, according to an embodiment 3 of the present invention.

FIG. 5 is a block diagram for partially indicating a servo control apparatus according to an embodiment 3 of the present invention. In this case, while the differentiating device 20e of the current command signal 15 executed in the arrangement of the above-described phase compensating device 20A shown in FIG. 4 is deleted, and also the integrating operation of the term 24 is deleted, a phase compensating device 20B is arranged by a primary delay system so as to reduce an error of a phase delay compensation signal 21, which is caused by noise and the like contained in the current command 15. As indicated in FIG. 5, in this embodiment, the phase compensating device 20B is arranged by a term 20h of (1/(s +α)) and a term 24B of (Kt hat/J hat). Since other arrangements are similar to those shown in FIG. 1 and FIG. 4, descriptions thereof are omitted.

Figure 12:
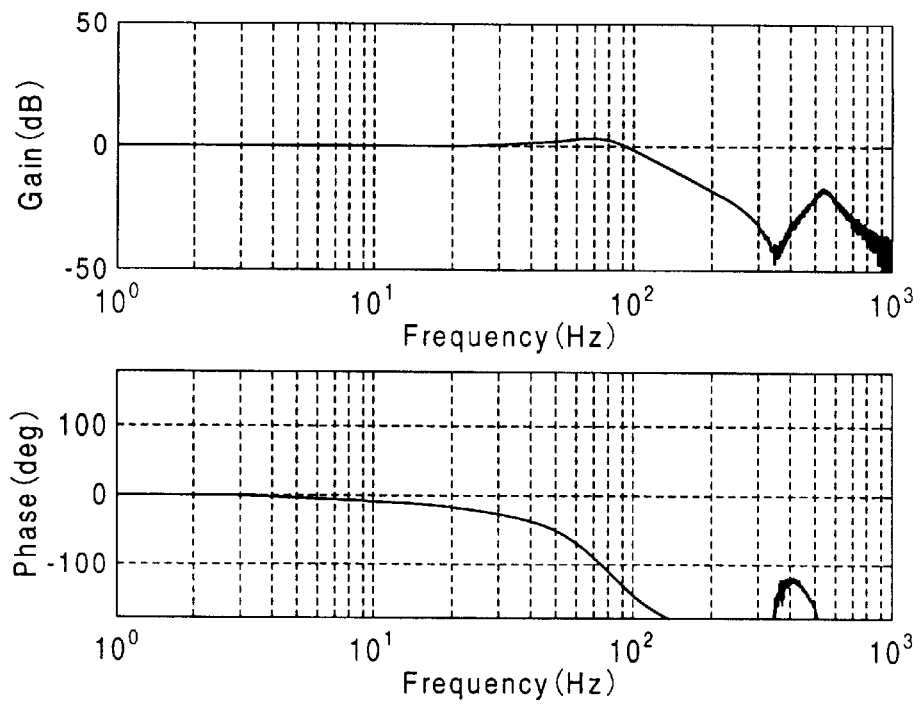
FIG. 12 is a graph for representing the frequency response of the speed loop in the case that a low-pass filter is applied to the conventional servo control apparatus having the mechanical resonance.

In this case, FIG. 12 represents a speed loop frequency response of the conventional servo system in the case where a low-pass filter having a cut-off frequency range at a frequency of 100 Hz is inserted as a mechanical resonance suppressing filter into a circuit subsequent to the speed control unit 3 in a servo system in which mechanical resonance indicative of the speed loop frequency response of FIG. 9 owns approximately 600 Hz. Also, in this case, in the speed control range, the gain exceeds 0 dB and is further increased due to the phase delay caused by the low-pass filter, and also the phase margin is lost, so that this servo system becomes an unstable system as the speed control loop.

Figure 13:
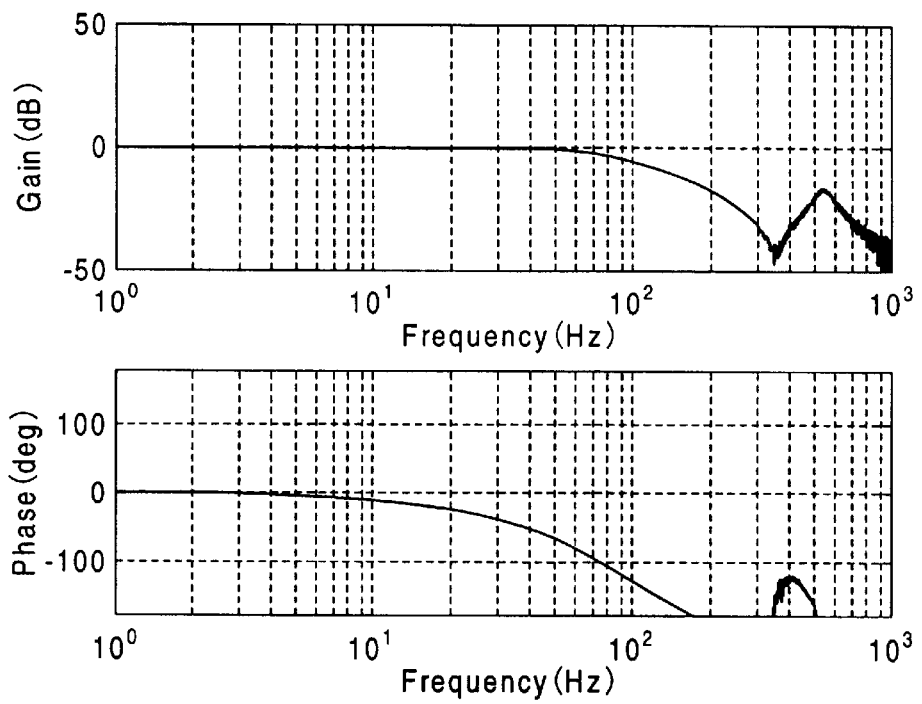
FIG. 13 is a graph for indicating a frequency response of a speed loop of a servo control apparatus having mechanical resonance indicative of an effect of the embodiment 3 of the present invention.

In this case, FIG. 13 represents a speed loop frequency response defined from the speed command signal 12 up to the speed detection signal 13 of the servo control apparatus when the phase compensating device 20B of FIG. 1 and FIG. 5, according to the embodiment of the present invention, is conducted. At this time, there is no gain increase in the speed control range as seen in FIG. 12, and the stable control loop capable of obtaining the phase margin can be realized.

As previously explained, in the servo control apparatus of this embodiment, a similar effect to that of the above-explained embodiment 1 can be achieved. Furthermore, since the phase delay compensation calculation executed when the low-pass filter is employed in the mechanical resonance suppressing filter is arranged by a simple primary delay, it is possible to reduce the errors produced in the phase delay compensation signal, which is caused by the adverse influence such as noise contained in the current command.

Embodiment 4.

Figure 6:
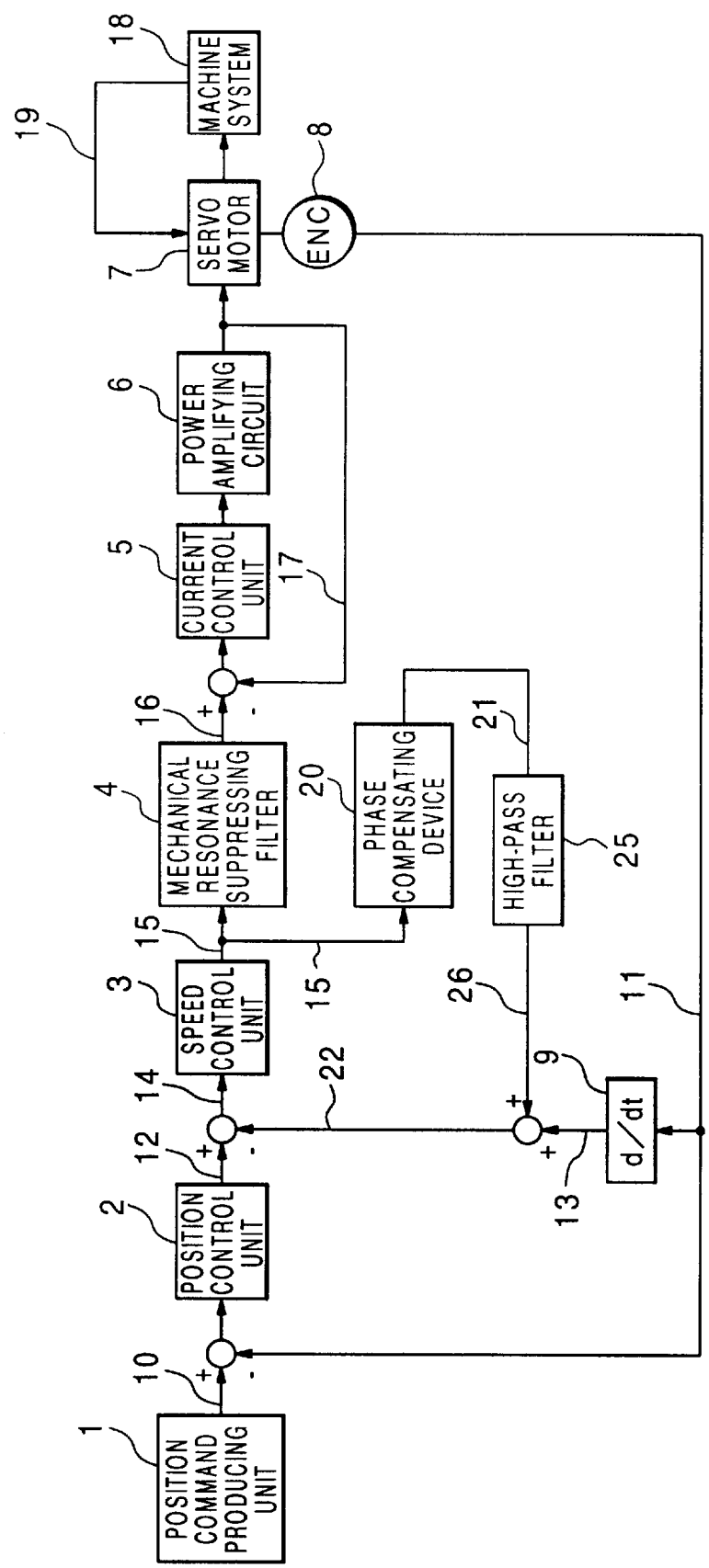
FIG. 6 is a block diagram for representing a servo control apparatus according to an embodiment 4 of the present invention.

FIG. 6 is a block diagram for indicating a servo control apparatus according to an embodiment 4 of the present invention. While the arrangement shown in FIG. 6 is basically similar to that of FIG. 1, in this embodiment, before the phase delay compensation signal 21 corresponding to the output of the phase compensating device 20 is added to the speed detection signal 13, a high-pass filter 25 is inserted which removes frequency components lower than, or equal to a specific frequency. When the frequency of the current command signal 15 is low, signal components for phase delay compensations of a low frequency range are reduced. In this case, as to the mechanical resonance suppressing filter 4 and the phase compensating device 20, any one of the above-explained embodiments 1, 2, and 3 of the present invention may be employed.

The present invention has an object to compensate a phase delay caused by a mechanical resonance suppressing filter. Normally, since the above-explained mechanical resonance suppressing filter is inserted so as to suppress mechanical resonance and the like, the frequencies of which are higher than those of the control range, the phase compensation is not required originally in the low frequency range. Originally, the phase compensating device 20 in accordance with the embodiments 1, 2, and 3 of the present invent invention is arranged by a form in which the frequency range whose gain is cut by the mechanical resonance suppressing filter 4 is compensated. Thus, the phase compensation signal 21 can be substantially neglected in the low frequency range where the phase compensation is not required, and the speed detection signal 13 corresponding to the actual machine speed is made substantially identical to the speed command signal 12. However, in the case where the setting frequency of the mechanical resonance suppressing filter is low, for example, when the frequency of the current command signal 15 is lower than a preselected value, there are some cases that the adverse influence of the phase delay compensation signal 21 may give an adverse influence to positional precision of a machine. In such a case, the high-pass filter 25 shown in FIG. 6 according to this embodiment is inserted so as to remove the frequency components lower than, or equal to the specific frequency. As a result, if the phase compensation signal 21 is reduced, then this adverse influence can be mitigated. As has been described, the high-pass filter 25 constitutes a compensation signal reducing means capable of reducing the phase delay compensation signal.

In this embodiment mode, also in the case where the setting frequency of the mechanical resonance suppressing filter is low and also the influence of the phase delay compensation signal 21 may adversely influence the positioning precision of the machine and so on, the high-pass filter 25 is inserted into the output of the phase delay compensation signal 21, so that this adverse influence can be mitigated.

Embodiment 5.

Figure 7:
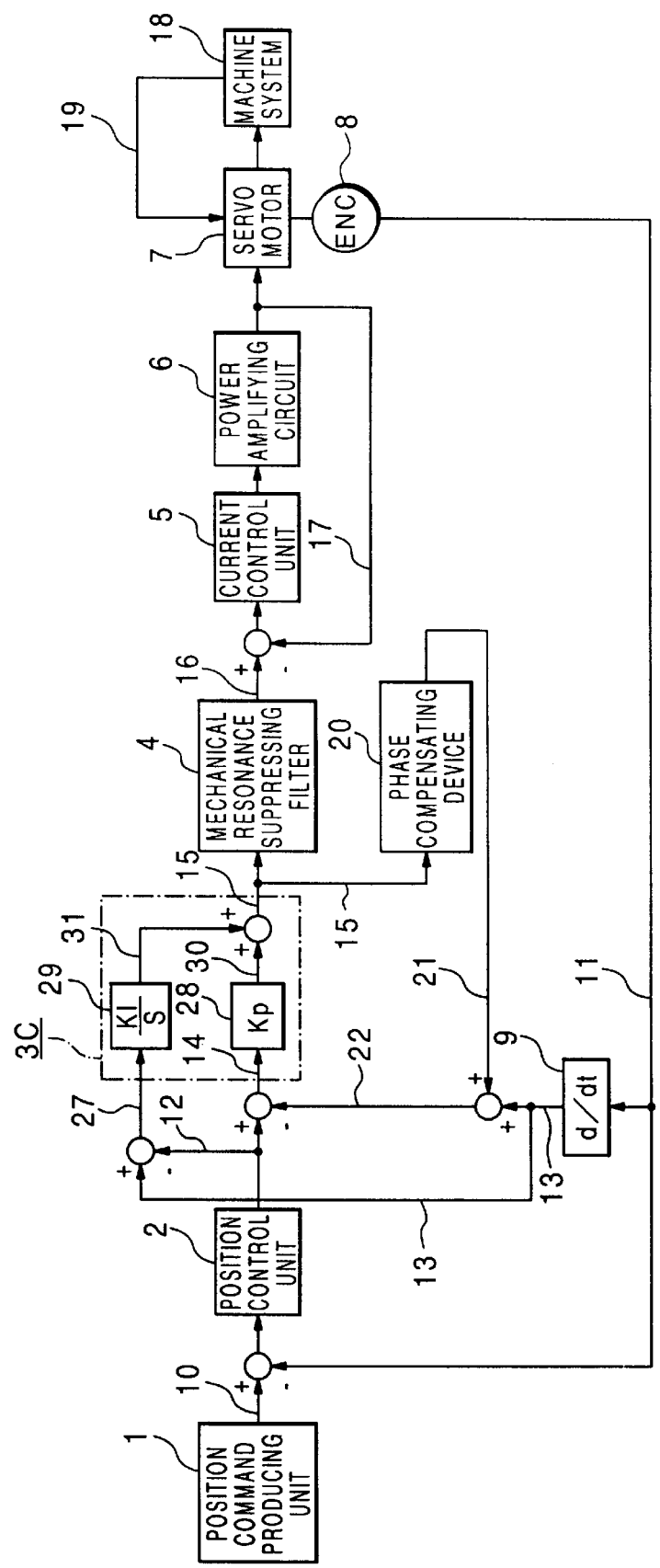
FIG. 7 is a block diagram for representing a servo control apparatus according to an embodiment 5 of the present invention.

FIG. 7 is a block diagram for showing a servo control apparatus according to an embodiment 5 of the present invention. The speed control unit 3 according to this embodiment 5 is basically constructed of a PI control. In this case, as a mechanical resonance suppressing filter 4 and a phase compensating device 20, any one of the above-described components employed in the embodiments 1, 2, and 3 may be applied. In FIG. 7, reference numeral 28 denotes a proportional control unit, reference numeral 29 indicates an integral control unit, reference numeral 27 represents a deviation signal between a speed command signal 12 and a speed detection signal 13 indicative of an actual machine speed, reference numeral 30 denotes a proportional term current command signal outputted from the proportional control unit 28, and also reference numeral 31 denotes an integral term current command signal outputted from the integral control unit 29. It should be understood that a current command signal 15 corresponding to the output of the speed control unit 3 is constituted by combining the proportional term current command signal 30 with the integral term current command signal 31.

This embodiment has a purpose capable of compensating for the deviation between the speed detection signal 13 corresponding to the actual machine speed and the speed command signal 12 based upon the output signal 21 of the phase compensating device 20. In this embodiment, in order to reduce the above-described deviation to 0 in such a low frequency range that the phase delay caused by the mechanical resonance suppressing filter 4 does not make a problem, the deviation signal 27 is entered into the input of the integral control unit 29 for performing the I control within the PI control, namely the integral control. This deviation signal 27 corresponds to the deviation between the speed detection signal 13 equal to the actual machine speed and the speed command signal 12. Also, in order to compensate for the phase delay of the mechanical resonance suppressing filter 4 in the high frequency range, another deviation signal 14 is inputted into the input of the proportional control unit 28 for performing the P control within the PI control, namely the proportional control. This deviation signal 14 corresponds to such deviation between the speed command signal 12 and a speed feedback signal 22 which is produced by loading a phase delay compensation signal 21 on the speed detection signal 13.

As previously described, in this embodiment, while performing the PI control in a speed control unit 3C, the difference between the speed command signal 12 and the speed feedback signal 22 to which the phase delay compensation component 21 has been added is entered into the input of the proportional control unit 28 corresponding to the P control, whereas the difference between the speed command signal 12 and the speed detection signal (speed feedback signal) 13 to which the phase delay compensation component 21 is not added is entered into the input of the integral control unit 29 corresponding to the I control. As a result, it is possible to reduce the error between the actual speed feedback and the speed command signal 12. This error is caused by adding the phase delay compensation component 21 to the speed feedback.

Embodiment 6.

Figure 8:
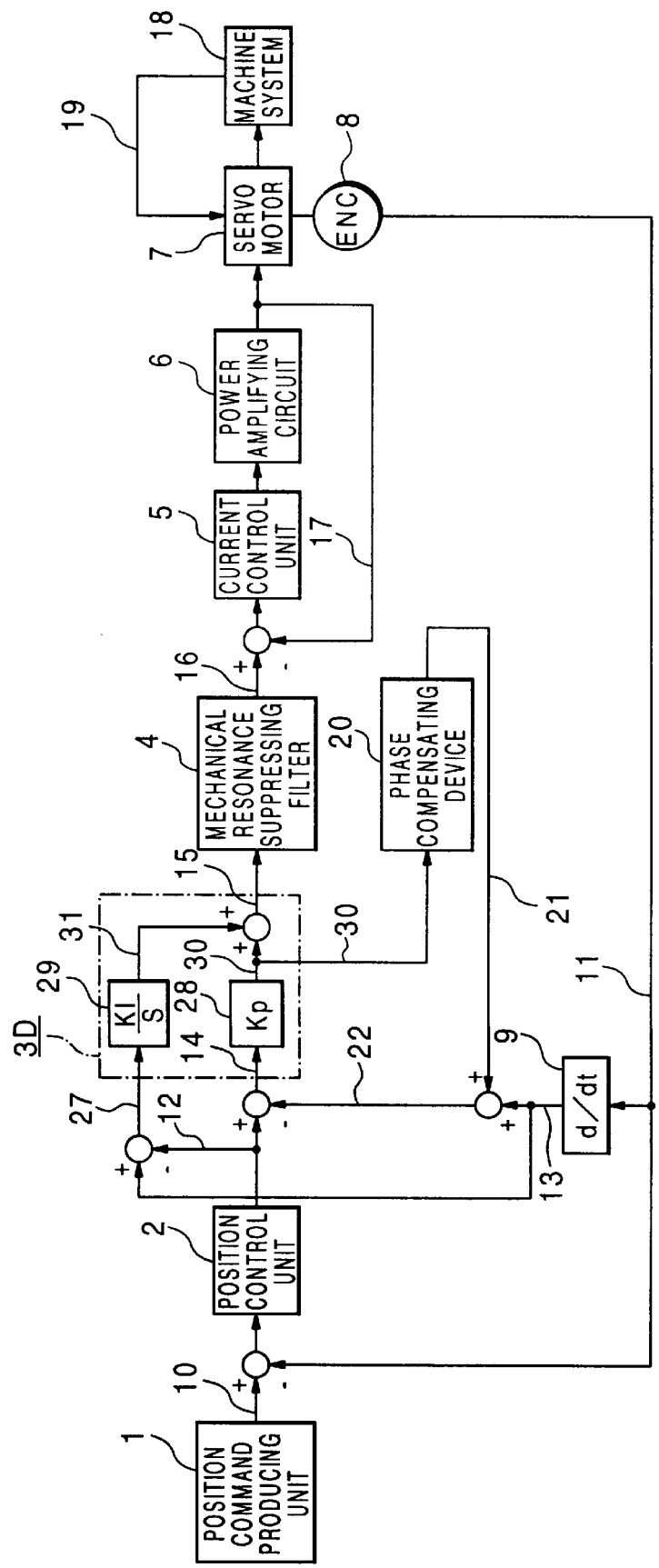
FIG. 8 is a block diagram for representing a servo control apparatus according to an embodiment 6 of the present invention.

FIG. 8 is a block diagram for showing a servo control apparatus according to an embodiment 6 of the present invention. A speed control unit 3D according to the embodiment 6 is basically constructed of a PI control. The arrangement of the speed control unit 3D in this embodiment is basically similar to the arrangement of the above-described speed control unit 3C shown in FIG. 7. A point of difference in this embodiment is that the output to the phase compensating device 20 is constituted by not the current command signal 15, but by the proportional term current command signal 30 corresponding to the output signal of the proportional control unit 28. In this case, as a mechanical resonance suppressing filter 4 and a phase compensating device 20, any one of the above-described components employed in the embodiments 1, 2, and 3 may be applied.

The servo control apparatus according to this embodiment 6 is arranged as follows: That is, in such a system that friction and load torque of the machine system 18 are large, or unbalanced torque when being applied to a gravity shaft is large, in the case that the current command signal 15 outputted by the PI control indicates a static value which does not appear directly in motor rotation motions when the servo motor 7 is accelerated and decelerated due to the adverse influences of the above-described torque, since the phase delay compensation signal 21 is produced which is larger than the originally required value, such deviation between the speed detection speed signal 13 equal to the actual machine speed and the speed instruction signal 12 is not produced. In other words, the current command signal 15 is mainly produced by the integral term current command signal 31 shown in FIG. 8, but the proportional term current command signal 30 takes a small part. This current command signal 15 corresponds to the friction and the load torque of the above machine system 18, or the unbalanced torque when being applied to the gravity shaft or the like. Conversely, in the high frequency range, the proportional term current command 30 takes a large part. As a consequence, in this embodiment, as the signal used in the calculation for compensating for the phase delay, the proportional term current command signal 30 is used. As a consequence, with respect to the mechanical resonance suppressing filter 4, the phase delay thereof can be compensated, and also, the following improvement can be made. That is, it is possible to avoid such a fact that the phase delay compensation signal 21 is unnecessarily increased due to the friction and the load torque, or the unbalanced torque when being applied to the gravity shaft, or the like.

As previously explained, in this embodiment, as the input signal of the phase compensating device 20, not the current command signal 15 is employed but the proportional term current command signal 30 outputted from the proportional control unit 28 is employed. As a result, it is possible to avoid an increase of the phase delay compensation signal 21 when the current command signal 15 statically owns a certain value due to the load torque and the unbalanced torque of the machine system 18, and thus an increase in error between the speed command signal 12 and the actual speed detection signal 13 (speed feedback signal) is prevented.

Industrial Applicability

A servo control apparatus of the present invention comprises: a servo motor for driving a predetermined machine system; detection means for detecting both a position of the servo motor and a speed of the servo motor; position control means for producing a speed command signal based upon a difference between an externally entered position command signal and a position detection signal outputted from the detection means; speed control means connected to the position control means, for producing a first current command signal indicative of a value of a current to be supplied to the servo motor; mechanical resonance suppressing filter means for converting the first current command signal into a second current command signal used to suppress resonance and vibrations, which are caused by a characteristic frequency of the machine system; current control means for controlling a current to be supplied to the servo motor based upon the second current command signal; phase compensating means for calculating based on the first current command signal, a speed component corresponding to a phase delay occurring in a speed loop defined from the speed command signal up to the speed detection signal, which is caused by providing the mechanical resonance suppressing filter means; and for outputting the speed component obtained by the calculation as a phase delay compensation signal; and speed feedback signal producing means for producing a speed feedback signal by adding the phase delay compensation signal to the speed detection signal, wherein the speed control means produces the first current command signal based upon a difference between the speed command signal outputted form the position control means and the speed feedback signal. Since the phase delay caused by the mechanical resonance suppressing filter is calculated and the speed feedback signal produced by adding the speed component corresponding to this phase delay to the actual motor speed is used for control, there are such an effect that the adverse influence of the phase delay caused by inserting the mechanical resonance suppressing filter can be reduced, and as a result, the servo system having the high gain can be realized.

The mechanical resonance suppressing filter means may comprise an FIR type notch filter. The fixed frequency component can be readily removed, and the mechanical resonance suppressing filter means can be easily manufactured. Furthermore, since the speed feedback signal produced by adding the speed component corresponding to the phase delay by the filter to the actual motor speed is used for control, there are such an effect that the adverse influence of the phase delay caused by inserting the mechanical resonance suppressing filter can be reduced, and as a result, the servo system having the high gain can be realized.

Alternatively, the mechanical resonance suppressing filter means may comprise a low-pass filter for removing frequency components higher than, or equal to a specific frequency. The gains of the frequencies higher than, or equal to a preselected frequency can be easily decreased. Furthermore, since the speed feedback signal produced by adding the speed component corresponding to the phase delay to the actual motor speed is used for control, there are such an effect that the adverse influence of the phase delay caused by inserting the mechanical resonance suppressing filter can be reduced, and as a result, the servo system having the high gain can be realized.

Also, the low-pass filter includes an integrating device. Since the servo control apparatus is arranged by the simple primary delay system made of the integrating device, there is an effect that the error produced in the phase delay compensation signal, caused by the adverse influence such as noise contained in the current command signal, can be reduced.

The servo control apparatus of the present invention further comprises: compensation signal reducing means provided between the phase compensating means and the speed feedback signal producing means, for reducing the phase delay compensation signal, in the case where a frequency of the first current command signal is lower than a predetermined value. Even in the case where the setting frequency of the mechanical resonance suppressing filter is low and the influence of the phase delay compensation signal gives the adverse influence to the positioning precision of the machine, since the compensation signal reducing means is inserted into the output of the phase delay compensation signal, there is an effect that this adverse influence can be mitigated.

The speed control means may comprise a proportional control unit for performing a proportional control and an integral control unit for performing an integral control. The proportional control unit may produce a proportional term current command signal based upon the difference between the speed command signal outputted from the position control means and the speed feedback signal. The integral control unit may produce an integral term current command signal based upon the difference between the speed command signal outputted form the position control means and the speed detection signal outputted form the detection means. A signal obtained by adding the proportional term current command signal to the integral term current command signal may be used as the first current command signal corresponding to the output of the speed control means. There is such an effect that the error between the speed command signal and the actual speed feedback signal, which is produced by adding the phase delay compensation to the speed feedback, can be canceled.

The proportional term current command signal outputted form the proportional control unit may be employed as an input of the phase compensating means. There is such an effect to avoid such a fact that when the current command statically owns a certain preselected value due to the load torque of the mechanical system and also the unbalanced torque, the phase compensation signal is increased, and the increase in error between the speed command signal and the actual speed feedback signal is prevented.

What is claimed is:

1. A servo control apparatus comprising:
    a servo motor for driving a predetermined machine system;
    detection means for detecting both a position of said servo motor and a speed of said servo motor;
    position control means for producing a speed command signal based upon a difference between an externally entered position command signal and a position detection signal outputted from said detection means;
    speed control means connected to said position control means, for producing a first current command signal indicative of a value of a current to be supplied to said servo motor;
    mechanical resonance suppressing filter means for converting said first current command signal into a second current command signal used to suppress resonance and vibrations, which are caused by a characteristic frequency of said machine system;
    current control means for controlling a current to be supplied to said servo motor based upon said second current command signal;
    phase compensating means for calculating based on said first current command signal, a speed component corresponding to a phase delay occurring in a speed loop defined from said speed command signal up to said speed detection signal, which is caused by providing said mechanical resonance suppressing filter means; and for outputting said speed component obtained by said calculation as a phase delay compensation signal; and
    speed feedback signal producing means for producing a speed feedback signal by adding said phase delay compensation signal to said speed detection signal, wherein
    said speed control means produces said first current command signal based upon a difference between said speed command signal outputted form said position control means and said speed feedback signal.

2. A servo control apparatus as claimed in claim 1, wherein said mechanical resonance suppressing filter means comprises an FIR type notch filter.

3. A servo control apparatus as claimed in claim 1, wherein
    said mechanical resonance suppressing filter means comprises a low-pass filter for removing frequency components higher than, or equal to a specific frequency.

4. A servo control apparatus as claimed in claim 3, wherein said low-pass filter includes an integrating device.

5. A servo control apparatus as claimed in claim 1, further comprising:
    compensation signal reducing means provided between said phase compensating means and said speed feedback signal producing means, for reducing said phase delay compensation signal, in the case where a frequency of said first current command signal is lower than a predetermined value.

6. A servo control apparatus as claimed in claim 1, wherein:
    said speed control means comprises a proportional control unit for performing a proportional control and an integral control unit for performing an integral control;
    said proportional control unit produces a proportional term current command signal based upon the difference between said speed command signal outputted from said position control means and said speed feedback signal;
    said integral control unit produces an integral term current command signal based upon the difference between said speed command signal outputted form said position control means and said speed detection signal outputted form said detection means; and
    a signal obtained by adding said proportional term current command signal to said integral term current command signal is used as said first current command signal corresponding to the output of said speed control means.

7. A servo control apparatus as claimed in claim 6, wherein
    said proportional term current command signal outputted form said proportional control unit is employed as an input of said phase compensating means.

* * * * *